Dec. 6, 1938.  F. J. HARLOW  2,139,582
THERMOMETER WELL
Filed Dec. 30, 1937
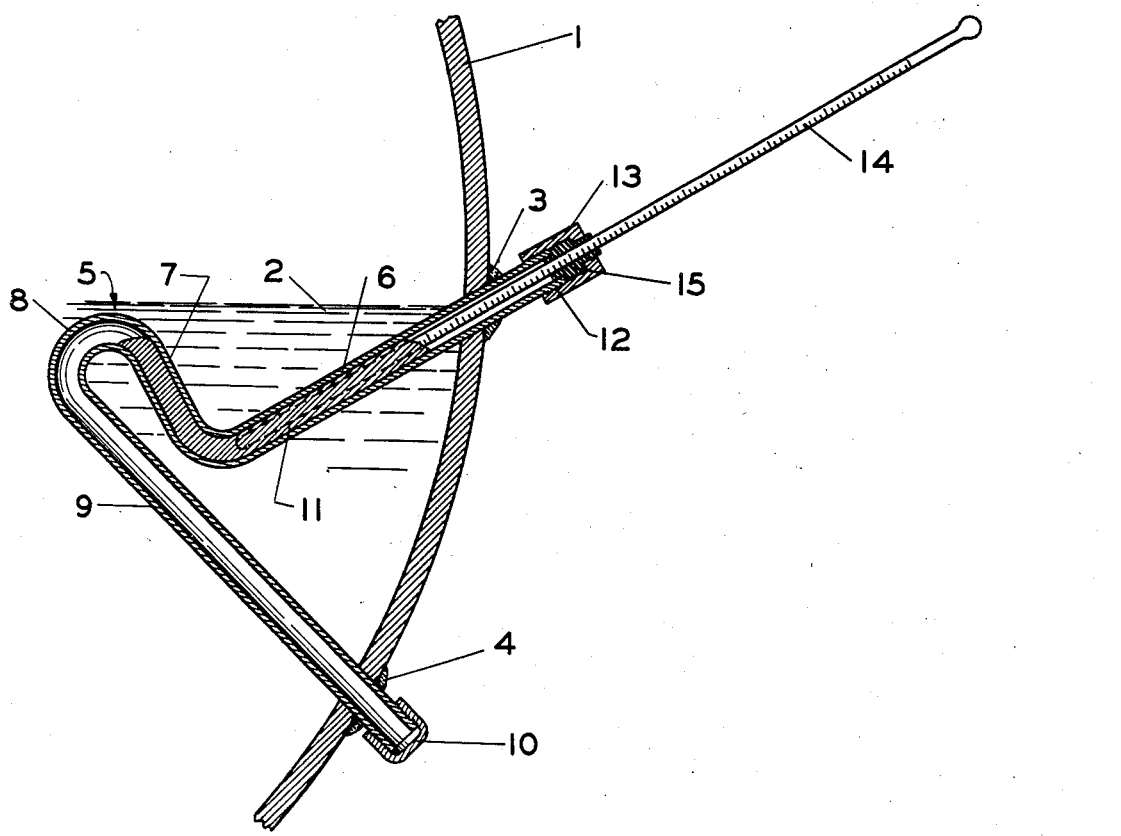
INVENTOR.
F. J. HARLOW
BY
ATTORNEYS.

Patented Dec. 6, 1938

2,139,582

UNITED STATES PATENT OFFICE 2,139,582

THERMOMETER WELL

Frederick J. Harlow, Bartlesville, Okla., assignor to Phillips Petroleum Company, a corporation of Delaware Application December 30, 1937, Serial No. 182,615

3 Claims. (Cl. 73—375)

This invention relates to a new and improved thermometer well which is placed in containers to get a more accurate heat transfer from the contents of the container to the thermometer that is recording the temperature of the container contents.

It is necessary to frequently take the temperature of the contents of tanks and containers containing various liquids and heretofore this has been done by drilling or cutting a hole in the side or end of the container and inserting therethrough a plain, straight tube at an angle, fixing its position by welding same to the wall of the container. Into this straight tube is poured a certain amount of mercury which very accurately registers the temperature of the fluid contacted. A reading is obtained by inserting into the well the ordinary thermometer, having it come in contact with the mercury, but quite often foreign material, sometimes water, gets into this tube, which in turn cuts down the heat conductivity of the mercury, thus preventing an accurate reading of the temperature of the container contents and due to the angle at which the tube is placed it is practically impossible to remove the mercury from the tube so the foreign matter may be removed from the mercury and the well thoroughly cleaned.

It is an object of this invention to provide a thermometer well for a container wherein the material used as the heat conductor can readily be removed and the foreign matter cleaned from both the material and the well.

Other objects and advantages of the invention will be apparent during the course of the following description.

In the accompanying drawing, forming a part of this specification and in which like numerals are employed to designate like parts throughout the same, The figure of the drawing is a sectional view of the thermometer well mounted in the side wall of a container.

In the drawing, wherein for the purpose of illustration is shown a preferred embodiment of my invention, the numeral 1 represents the side wall of a container having liquid 2 therein. Mounted in the side wall 1 of the container by welds 3 and 4 is the thermometer well tube 5, the main body of which is within the container. The upper portion of the well tube 6 extends downwardly in the tank at an angle of approximately 30° with the level of the liquid in the container and extends for a substantial distance into the container. The well tubing is then bent upwardly until the tubing forms approximately a 45° angle with level of the liquid in the container. The well tubing is then bent downwardly making substantially a U-bend 8 in the tubing and the portion 9 of the tubing is brought up through the container wall and welded as at 4. The end of the tubing 9 outside of the container is closed by a cap member 10 which is readily removable from the tubing. The portions 6 and 7 of the tubing contain mercury 11 and the mercury in the tubes 6 and 7 tends to assume the same level in the respective tubes and since the tubes 6 and 7 and the mercury 11 are both immersed in the liquid of the tank, the mercury will tend to assume the same temperature as the liquid in the tank. The upper end of the thermometer well tubing is screw threaded at 12 to receive the screw thimble 13. The thermometer 14 passes through the packing 15 into the tube 6 and the bulb end of the thermometer is immersed in the mercury of the thermometer well. The thimble 13 is screwed down tightly on the packing 15 which is of rubber and distorts under pressure to force a seal between the tube 6 and the thermometer. The thermometer 14 may be left in the well at all times or may be removed and attached again as the temperatures are desired. If the thermometer is removed, the end portion of the section 6 is closed by a cap member, the same as shown at 10.

When it becomes necessary to remove the mercury to clean both the mercury and the well, the cap 10 is removed from the lower end of the tube 5 and pressure applied to the upper end of the portion 6 of the tubing 5. The mercury is forced by the pressure, out through the tube 9 where it flows into a container. A swab is then run through the well to clean the inner tube surfaces of any foreign material and the mercury is purified by any known process before it is again put back into the well.

This thermometer well is also adjustable to receiving industrial metal bulb thermometers and also thermometer bulbs when the recording instrument is remotely located and connected by a tube to the bulb which is located in the above described type of well. The same type well is also adaptable to temperature control devices.

It is to be understood that the form of my invention herewith shown and described, is to be taken as a preferred example of the same, and that various changes in the shape, size and arrangement of parts may be resorted to without departing from the spirit of my invention, or the scope of the subjoined claims.

Having thus described my invention, I claim:

1. A thermometer well mounted in the wall of a container and having the main body of the well mounted within the container, comprising a tubing member, said tubing member being reversely bent within the container to form a well, and the end portions of the tubing secured to the container wall and communicating with the exterior of the container.

2. A thermometer well mounted in the wall of a container and having the main body of the well mounted within the container, comprising a tubing member, said tubing having the upper end thereof shaped to form a well for a heat conducting fluid, the lower end reversely bent, and the upper and lower end portions of the tubing secured to the container wall and communicating with the exterior of the container.

3. A thermometer well mounted in the wall of a container and having the main body of the well mounted within the container, comprising a tubing member, said tubing having the upper end thereof extending downwardly into the container at an angle to the fluid level in the container, the tube then extending upwardly at an angle to the fluid level in the container to form a well for the heat conducting fluid, the tube then being reversely bent and extending downwardly and the upper and lower ends of the tubing secured to the container wall and communicating with the exterior of the container.

FREDERICK J. HARLOW.